US008681625B2

(12) United States Patent
Kim et al.

(10) Patent No.: US 8,681,625 B2
(45) Date of Patent: *Mar. 25, 2014

(54) METHOD AND APPARATUS FOR CONTROLLING RATE OF VOICE SERVICE IN A MOBILE COMMUNICATION SYSTEM SUPPORTING VOICE SERVICE VIA PACKET NETWORK

(75) Inventors: Soeng-Hun Kim, Suwon-si (KR); Sung-Ho Choi, Suwon-si (KR); Gert-Jan Van Lieshout, Middlesex (NL); Himke Van Der Velde, Middlesex (GB); O-Sok Song, Seoul (KR); No-Jun Kwak, Seoul (KR); Kyeong-In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 401 days.

This patent is subject to a terminal disclaimer.

(21) Appl. No.: 12/659,168

(22) Filed: Feb. 26, 2010

(65) Prior Publication Data

US 2010/0220717 A1    Sep. 2, 2010

Related U.S. Application Data

(63) Continuation of application No. 11/478,524, filed on Jun. 30, 2006, now Pat. No. 7,792,035.

(30) Foreign Application Priority Data

Jul. 1, 2005    (JP) .................................. 2005-59291

(51) Int. Cl.
    *G01R 31/08*    (2006.01)
(52) U.S. Cl.
    USPC ............ 370/235; 370/310; 370/230; 370/231

(58) Field of Classification Search
    USPC ......... 370/310, 328, 338, 352, 353, 354, 235, 370/230, 231
    See application file for complete search history.

(56) References Cited

U.S. PATENT DOCUMENTS

| 6,839,356 B2 | 1/2005 | Barany et al. |
| 2001/0043577 A1* | 11/2001 | Barany et al. ................. 370/328 |

(Continued)

FOREIGN PATENT DOCUMENTS

| EP | 1 336 314 | 2/2005 |
| KR | 2004-0064834 | 7/2004 |

(Continued)

OTHER PUBLICATIONS

XP002177164, ETSI EN 301 709, V.7.0.2, Digital Cellular Telecommunications System (Phase 2+); Link Adaptation (GSM 05.09 Version 7.0.2., Released 1998).

*Primary Examiner* — Wayne Cai
(74) *Attorney, Agent, or Firm* — Roylance, Abrams, Berdo & Goodman, LLP

(57) ABSTRACT

A method for controlling a rate of a voice service in a mobile communication system supporting the voice service via a packet network. The method includes the steps of receiving a control message at a terminal from a radio network controller (RNC); if the control message indicates control of a downlink rate, determining a downlink rate according to the control message; setting a Change Mode Request (CMR) field of an uplink Voice over Internet Protocol (VoIP) packet according to the downlink rate, and transmitting the uplink VoIP packet from the terminal to the RNC; if the received control message indicates control of an uplink rate, determining an uplink rate according to the control message; and generating an uplink VoIP packet including uplink voice data generated according to the determined uplink rate and frame type (FT) information indicating the determined uplink rate, and transmitting the uplink VoIP packet from the terminal to the RNC.

9 Claims, 11 Drawing Sheets

(56) References Cited

U.S. PATENT DOCUMENTS

| | | |
|---|---|---|
| 2003/0063569 A1 | 4/2003 | Kalliokulju et al. |
| 2003/0206559 A1 | 11/2003 | Trachewsky et al. |
| 2004/0203448 A1* | 10/2004 | Nagata .................. 455/67.11 |
| 2005/0105604 A1 | 5/2005 | Ito et al. |
| 2006/0268845 A1 | 11/2006 | He et al. |
| 2008/0212575 A1* | 9/2008 | Westberg .................. 370/356 |

FOREIGN PATENT DOCUMENTS

| | | |
|---|---|---|
| KR | 2004-0079326 | 9/2004 |
| KR | 2005-0032954 | 4/2005 |
| RU | 2003-110572 | 8/2004 |
| WO | WO 99/52216 | 10/1999 |
| WO | WO 00/70791 | 11/2000 |
| WO | WO 01/28180 A2 | 4/2001 |
| WO | WO 01/63898 A2 | 8/2001 |

* cited by examiner

METHOD AND APPARATUS FOR CONTROLLING RATE OF VOICE SERVICE IN A MOBILE COMMUNICATION SYSTEM SUPPORTING VOICE SERVICE VIA PACKET NETWORK

CROSS-REFERENCE TO RELATED PATENT APPLICATION

This application is a continuation of U.S. patent application Ser. No. 11/478,524, filed Jun. 30, 2006, now U.S. Pat. No. 7,792,035, which in turn claims the benefit under 35 U.S.C. §119(a) of Korean Patent Application No. 2005-59291, filed Jul. 1, 2005, the entire disclosure of both of said prior applications being hereby incorporated by reference.

BACKGROUND OF THE INVENTION

1. Field of the Invention

The present invention relates generally to a mobile communication system supporting a voice service via a packet network. More particularly, the present invention relates to a method and apparatus for controlling a rate of a particular voice service.

2. Description of the Related Art

Mobile communication systems are evolving into high-speed, high-quality wireless data packet communication systems for providing not only the established voice-oriented service, but also data and multimedia services. A Universal Mobile Telecommunication Service (UMTS) system, which is the 3$^{rd}$ generation mobile communication system that is based on Global System for Mobile Communications (GSM) and General Packet Radio Services (GPRS) and uses Wideband Code Division Multiple Access (CDMA), provides a service in which users of mobile phones or computers can transmit packet-based text, digitized audio/video and multimedia data at a high rate of 2 Mbps or higher anywhere in the world. The UMTS system employs a packet-switched access concept that uses a packet protocol such as Internet Protocol (IP).

In this context, in the 3$^{rd}$ Generation Partnership Project (3GPP) that is responsible for standardization for the UMTS communication system, there is a discussion on Voice over Internet Protocol (VoIP) communications that support voice packets using Internet protocol in supporting a voice service.

VoIP refers to a communication technique for transmitting voice frames generated in a voice codec after converting the voice frames into IP/User Datagram Protocol (UDP)/Real time Transport Protocol (RTP) packets. With the use of VoIP, it is possible to provide voice service via the packet network.

FIG. 1 is a diagram illustrating a configuration of a conventional mobile communication system supporting VoIP.

Referring to FIG. 1, a user equipment (UE) 100 includes a codec 105 for converting a voice signal into a voice frame, an IP/UDP/RTP protocol layer 104 for making an IP/UDP/RTP packet with the voice frame from the codec 105, a Packet Data Convergence Protocol (PDCP) layer 103 for compressing a header of the IP/UDP/RTP packet, a Radio Link Control (RLC) layer 102 for converting the IP/UDP/RTP packet into an appropriate format to transmit it over a wireless channel, and a Medium Access Control (MAC)/Physical Layer (PHY) layer 101 for transmitting the packet data over the wireless channel.

The voice packet data transmitted from the UE 100 is delivered to a radio network controller (RNC) 120 via a Node B 110 over a wireless channel. The RNC 120, including a MAC/PHY layer 121, an RLC layer 122 and a PDCP layer 123, like the UE 100, converts the voice frame on the wireless channel into its original IP/UDP/RTP packet, and transmits the IP/UDP/RTP packet to a core network (CN) 130. The IP/UDP/RTP packet delivered to the CN 130 is transmitted to a receiving UE (not shown) via an IP network 140. The receiving UE, having the same hierarchical structure as that of the transmitting UE 100, restores the transmitted voice data to its original voice signal in the opposite order.

3GPP provides voice service using a voice codec called an Adaptive Multi Rate (AMR) codec, and the AMR codec is characterized by its variable rate, so it can adjust the rate according to conditions of the wireless channel.

FIG. 2 is a diagram illustrating a conventional AMR rate control process.

In a downlink (DL) rate control process of FIG. 2, both ends of a VoIP communication exchange VoIP packets 265 with each other. The VoIP packet 265 is composed of an IP/UDP/RTP header 240, an AMR payload specific header 257 and voice data 260. The AMR payload specific header 257 is composed of a Change Mode Request (CMR) field 245, Frame Type (FT) field 250 and an OTHER field 255.

The voice data 260 can have various sizes according to an AMR codec mode, and the FT field 250 is filled with information on the codec mode applied to the voice data. Therefore, a VoIP packet receiving party can ascertain a size and format of the voice data 260 by parsing the information in the FT field 250. Table 1 below shows exemplary sizes of voice data according to various codec modes used in the AMR.

TABLE 1

| Frame Type | AMR codec mode | Voice data size (bits) |
| --- | --- | --- |
| 0 | AMR 4.75 kbit/s | 112 |
| 1 | AMR 5.15 kbit/s | 120 |
| 2 | AMR 5.90 kbit/s | 128 |
| 3 | AMR 6.70 kbit/s (PDC-EFR) | 144 |
| 4 | AMR 7.40 kbit/s (TDMA-EFR) | 160 |
| 5 | AMR 7.95 kbit/s | 176 |
| 6 | AMR 10.2 kbit/s | 216 |
| 7 | AMR 12.2 kbit/s (GMS-EFR) | 256 |
| 8 | AMR SID | 56 |

The CMR field 245 is filled with information on a codec mode required for the other party. For example, if the other party desires to transmit voice data at 12.2 kbps, the CMR field 245 is filled with 7, which is an FT value associated with 12.2 kbps.

The OTHER field 255 is filled with such information indicating whether there is an error in the voice data. This field is not related to the gist of the exemplary embodiment present invention, so a description thereof will be omitted.

A description will now be made of a downlink rate control process performed in a UMTS network.

A VoIP communication is being performed between a UMTS terminal 205 and an IP entity 210 via an RNC 207. The IP entity 210 is a device for generating downlink VoIP packets, and can include, for example, a gateway or a VoIP terminal. In step 215, the IP entity 210 transmits a VoIP packet having a rate of y kbps to the UMTS terminal 205. In this case, an FT field of the VoIP packet is filled with a value x associated with the rate. In step 220, the UMTS terminal 205 desires to change the rate of the downlink VoIP packet. Exemplary reasons for the UMTS terminal 205 to change the rate of the downlink VoIP packet include, if there is a need to decrease the rate due to the deterioration of a downlink wireless channel, or to increase the rate due to the improvement of the downlink wireless channel.

In step 225, the UMTS terminal 205 inserts an FT value associated with a desired rate into a CMR field of an uplink (UL) VoIP packet before transmission. In step 230, upon receipt of the uplink VoIP packet, the IP entity 210 changes a rate of a downlink VoIP packet to x−1 according to a CMR field value. Thereafter, an FT of the downlink VoIP packet transmitted to the UMTS terminal 205 in step 235 becomes x−1.

Because the rate control in the conventional VoIP communication is performed on an end-to-end basis, the entity located in the middle of the transmission path cannot control the rate. However, in the UMTS network, there is a case where an RNC should be able to control an AMR rate so as to be closely associated with radio resources. For example, there is a possible case where the RNC should decrease a downlink/uplink AMR rate in order to limit to a specific level a ratio of VoIP traffic to all traffic of a particular cell. However, in conventional VoIP communications, the RNC cannot control the AMR rate.

Accordingly, there is a need for an improved method and apparatus for controlling a rate of a voice service in a mobile communication system supporting the voice service via a packet network

SUMMARY OF THE INVENTION

Exemplary embodiments of the present invention address at least the above problems and/or disadvantages and provide at least the advantages described below. Accordingly, an aspect of the present invention is to provide a method and apparatus for controlling a rate of a voice service in a mobile communication system supporting the voice service via a packet network.

The present invention provides a method and apparatus in which a network entity, such as an RNC, controls a rate of a voice service in a mobile communication system supporting the voice service via a network element.

Exemplary embodiments of the present invention provide a method and apparatus in which an RNC control an uplink AMR rate of a terminal by transmitting an Uplink AMR Rate Control message to the terminal.

Exemplary embodiments of the present invention provides a method and apparatus in which an RNC transmits a Downlink AMR Rate Control message to a terminal so that the terminal may appropriately set a CMR field value of an uplink VoIP packet.

According to one aspect of the present invention, there is provided a method for controlling a rate of a voice service in a mobile communication system supporting the voice service via a packet network. The method comprises the steps of receiving a control message at a terminal from a radio network controller (RNC); if the control message indicates control of a downlink rate, determining a downlink rate according to the control message; setting a Change Mode Request (CMR) field of an uplink Voice over Internet Protocol (VoIP) packet according to the downlink rate, and transmitting the uplink VoIP packet from the terminal to the RNC; if the received control message indicates control of an uplink rate, determining an uplink rate according to the control message; and generating an uplink VoIP packet including uplink voice data generated according to the determined uplink rate and frame type (FT) information indicating the determined uplink rate, and transmitting the uplink VoIP packet from the terminal to the RNC.

According to another aspect of the present invention, there is provided a method for controlling a rate of a voice service in a mobile communication system supporting the voice service via a packet network. The method comprises the steps of determining a new downlink/uplink rate to control information in a Change Mode Request (CMR) field or a frame type (FT) field of a downlink/uplink Voice over Internet Protocol (VoIP) packet for the voice service; generating a control message indicating the determined downlink/uplink rate; and transmitting the generated control message to a terminal.

According to further another aspect of the present invention, there is provided a method for controlling a rate of a voice service in a mobile communication system supporting the voice service via a packet network. The method comprises the steps of if there is a need to change a voice rate, changing a Change Mode Request (CMR) field of a Voice over Internet Protocol (VoIP) packet transmitted in an opposite direction of a path that needs the rate change to frame type (FT) information associated with the desired rate; recalculating a User Datagram Protocol (UDP) checksum of the VoIP packet according to the changed CMR field; and transmitting the VoIP packet filled with the changed CMR field and the recalculated UDP checksum to a destination.

According to yet another aspect of the present invention, there is provided an apparatus for controlling a rate of a voice service in a mobile communication system supporting the voice service via a packet network. The apparatus comprises a control message receiver for detecting Desired Downlink (DL) Frame Type information or Desired Uplink (UL) Frame Type information from a control message indicating control of a downlink/uplink rate received from a radio network controller (RNC); a Change Mode Request (CMR) field controller for determining a CMR field value indicating a downlink rate according to the Desired DL Frame Type information; a rate controller for determining an uplink rate according to the Desired UL Frame Type information; a header inserter for inserting the CMR field value received from the CMR field controller into a header of an uplink voice packet; a voice codec for converting a voice signal into voice data according to the determined uplink rate, and converting voice data included in a downlink packet into a voice signal; a transceiver for transmitting an uplink voice packet including the header and the voice data to the RNC, receiving a downlink voice packet from the RNC, and providing the received downlink voice packet to the voice codec.

According to still another aspect of the present invention, there is provided an apparatus for controlling a rate of a voice service in a mobile communication system supporting the voice service via a packet network. The apparatus comprises a rate decider for determining a new downlink/uplink rate to control information in a Change Mode Request (CMR) field or a frame type (FT) field of a downlink/uplink Voice over Internet Protocol (VoIP) packet for the voice service; a control message generator for generating a control message indicating the downlink/uplink rate provided from the rate decider; and a transceiver for transmitting the generated control message to a terminal.

According to still another aspect of the present invention, there is provided an apparatus for controlling a rate of a voice service in a mobile communication system supporting the voice service via a packet network. The apparatus comprises a rate decider for determining desired downlink frame type information and desired uplink frame type information; a Change Mode Request (CMR) field adjuster for setting a CMR field of an uplink/downlink Voice over Internet Protocol (VoIP) packet according to the frame type information; an uplink User Datagram Protocol (UDP) checksum calculator for recalculating a UDP checksum of an uplink VoIP packet delivered from the CMR field adjuster to update the UDP checksum; a downlink UDP checksum calculator for recalculating a UDP checksum of a downlink VoIP packet delivered from the CMR field adjuster to update the UDP checksum; and a transceiver for transmitting a downlink/uplink VoIP packet received from a calling user to the CMR field adjuster, and transmitting a downlink/uplink VoIP packet received from the downlink/uplink UDP checksum calculator to a corresponding destination.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In a mobile communication system providing a voice service via a packet network according to exemplary embodiments of the present invention, a network entity, such as an RNC, controls a rate of the voice service.

Exemplary embodiments of the present invention propose a scheme in which an RNC transmits an Uplink AMR Rate Control message to a terminal to control an uplink AMR rate of the terminal. In addition, the present invention proposes a scheme in which an RNC transmits a Downlink AMR Rate Control message to a terminal so that the terminal may appropriately set a CMR field value of an uplink VoIP packet.

Although exemplary embodiments of the present invention will be described with reference to an RNC in a 3GPP UMTS network, it can also be applied to an entity located in the middle of a transmission path in almost every VoIP communication network such as 3GPP Long Term Evolution (LTE) network. That is, a particular entity of a network that manages radio transmission resources can use a control message proposed in the exemplary embodiments of the present invention to control an uplink/downlink AMR rate of a particular terminal.

First Embodiment

Figure 1:
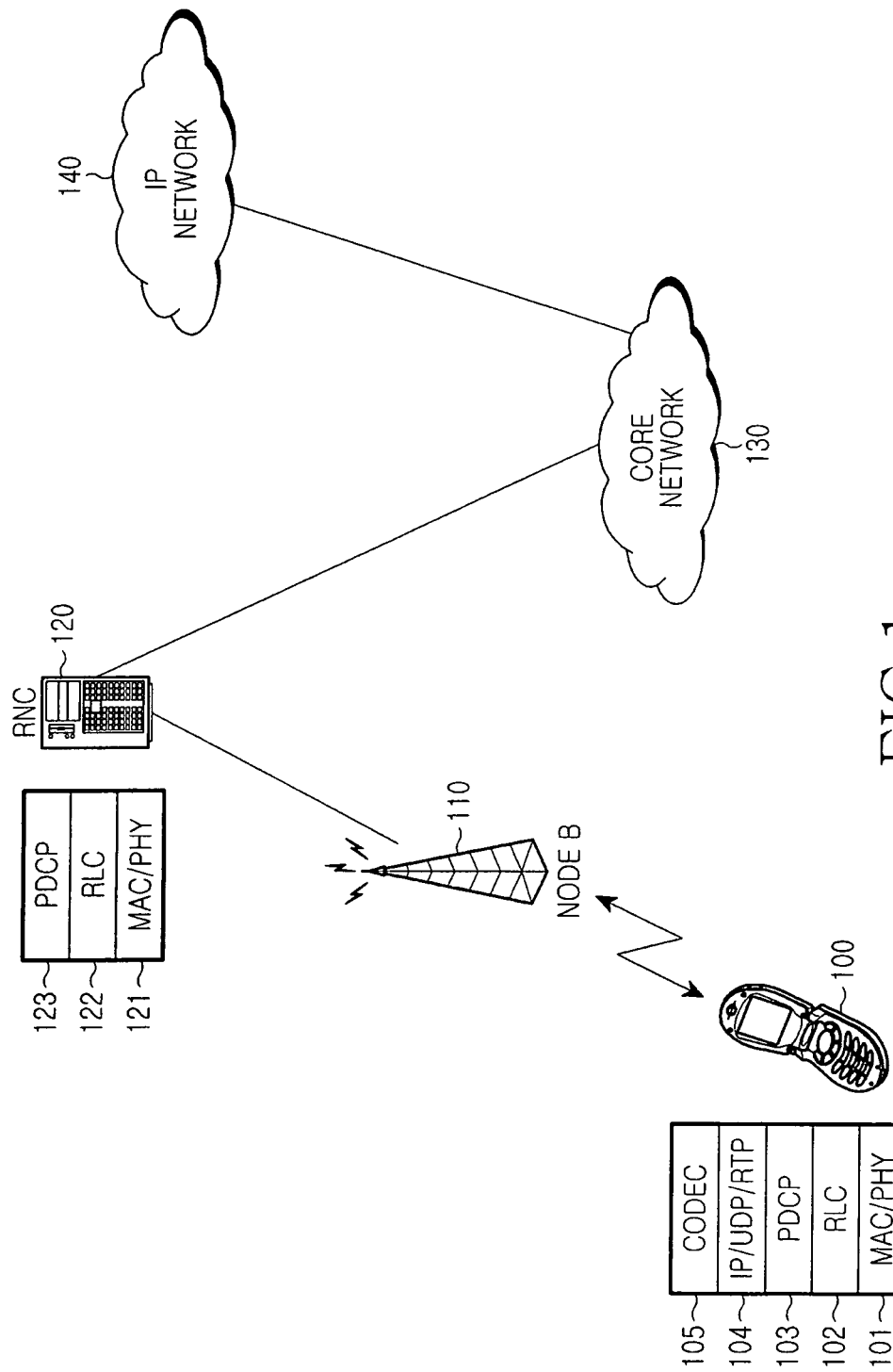
FIG. 1 is a diagram illustrating a configuration of a conventional mobile communication system supporting VoIP.
Figure 2:
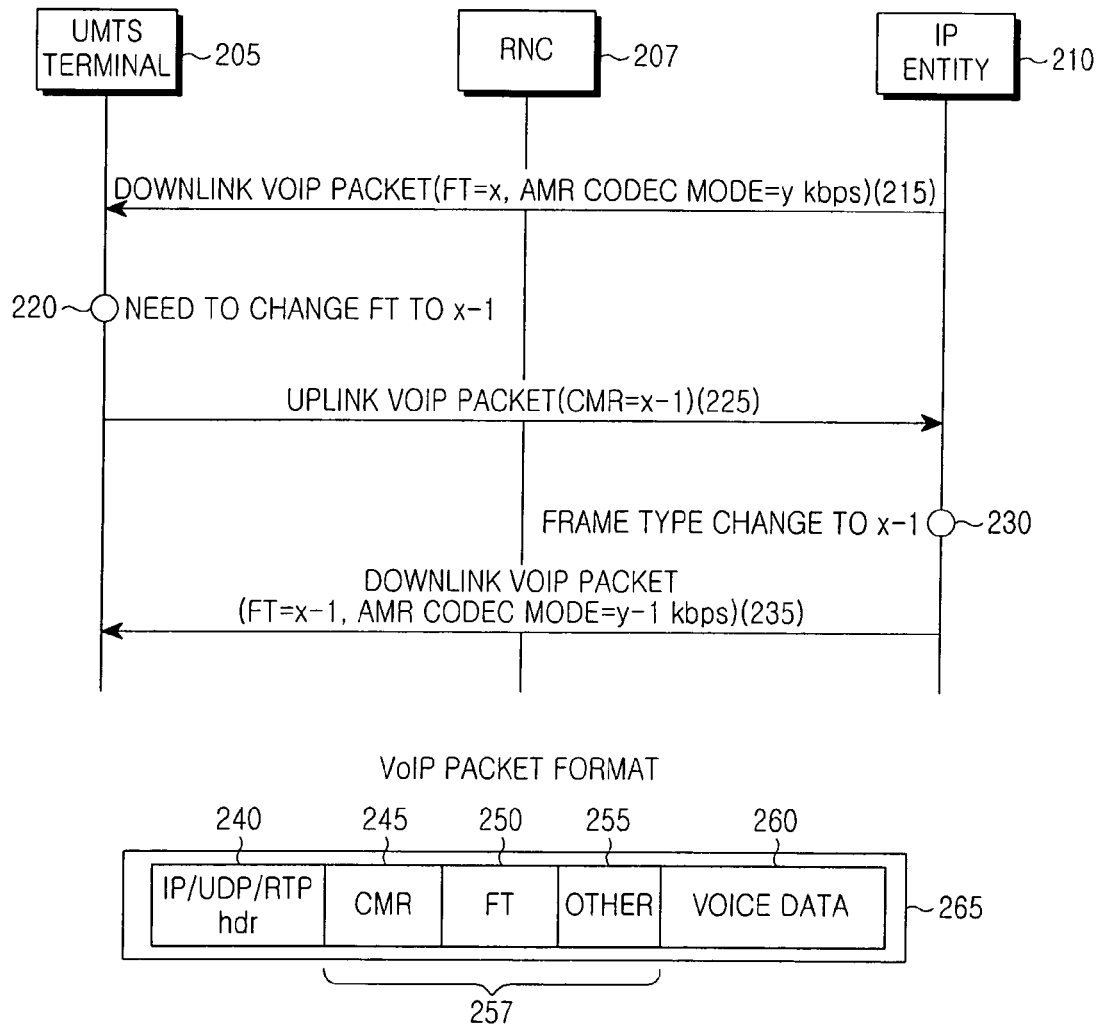
FIG. 2 is a diagram illustrating a conventional AMR rate control process.
Figure 3:
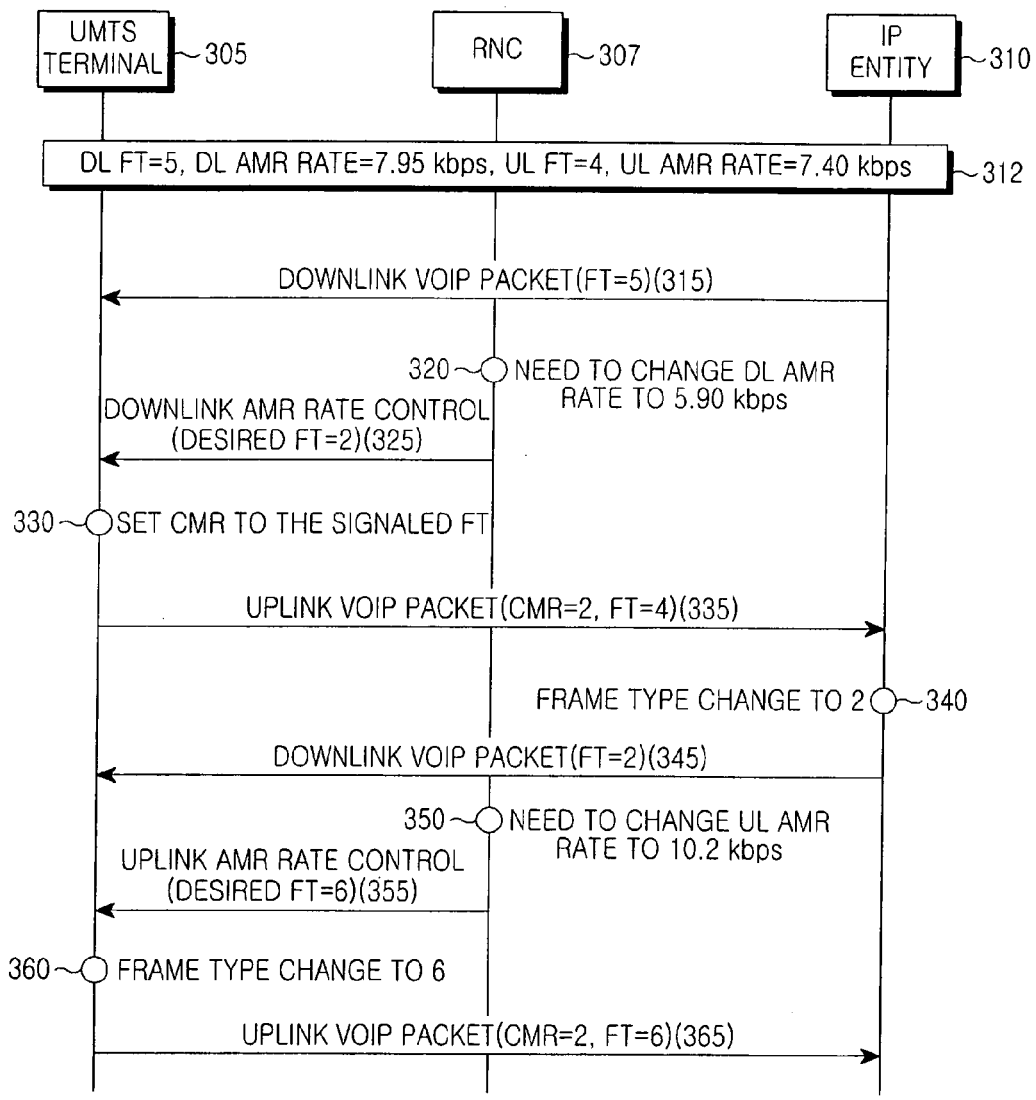
FIG. 3 is a diagram illustrating an AMR rate control operation according to a first exemplary embodiment of the present invention.

FIG. 3 is a diagram illustrating an AMR rate control operation according to a first exemplary embodiment of the present invention.

Referring to FIG. 3, in step 312, a VoIP communication is being performed between a UMTS terminal 305 and an IP entity 310. It is assumed that a downlink frame type (FT) is 5, a downlink AMR rate is 7.95 kbps, an uplink frame type is 4, and an uplink AMR rate is 7.40 kbps. Therefore, a frame type of a downlink VoIP packet transmitted from the IP entity 310 to the UMTS terminal 305 in step 315 is 5.

Thereafter, in step 320, an RNC 307 desires to change the downlink AMR rate to 5.90 kbps at a particular time. For example, the RNC 307 can decrease an AMR rate of the terminal, if it intends to accommodate traffic of a new terminal in the cell, but has insufficient downlink transmission resources. Because the downlink AMR rate is set by the IP entity 310 and direct communication is not possible between the IP entity 310 and the RNC 307, the RNC 307 controls the AMR rate of the IP entity 310 via the UMTS terminal 305 and is controllable by RNC 307 itself. More specifically, in step 325, the RNC 307 sets a 'desired FT' in a Downlink AMR Rate Control message to '2' associated with 5.90 kbps, and then transmits the Downlink AMR Rate Control message with the desired FT=2 to the UMTS terminal 305.

In step 330, upon receipt of the Downlink AMR Rate Control message, the UMTS terminal 305 sets a CMR field of an uplink VoIP packet according to the desired FT information in the received message. As a result, the CMR field of the uplink VoIP packet transmitted to the IP entity 310 in step 335 is set to '2'.

In step 340, if the VoIP packet arrives at the IP entity 310, the IP entity 310 sets a frame type of a downlink VoIP packet according to the CMR field information in the received VoIP packet. That is, by setting the frame type of the downlink VoIP packet transmitted in step 345 to '2', the IP entity 310 sets the downlink AMR rate to 5.90 kbps.

Thereafter, in step 350, the RNC 307 desires to change the uplink AMR rate from 7.40 kbps to 10.2 kbps at a particular time. For example, the RNC 307 can increase the uplink AMR rate, if it has sufficient available uplink transmission resources and thus desires to allow more uplink transmission resources for the terminal.

In step 355, the RNC 307 sets a desired FT in an Uplink AMR Rate Control message to '6' associated with 10.2 kbps, and transmits the Uplink AMR Rate Control message with desired FT=6 to the UMTS terminal 305.

In step 360, upon receipt of the Uplink AMR Rate Control message, the UMTS terminal 305 sets a frame type of an uplink VoIP packet according to the desired FT information in the received message.

That is, the frame type of the uplink VoIP packet transmitted to the IP entity 310 in step 365 is set to '6'.

Figure 4:
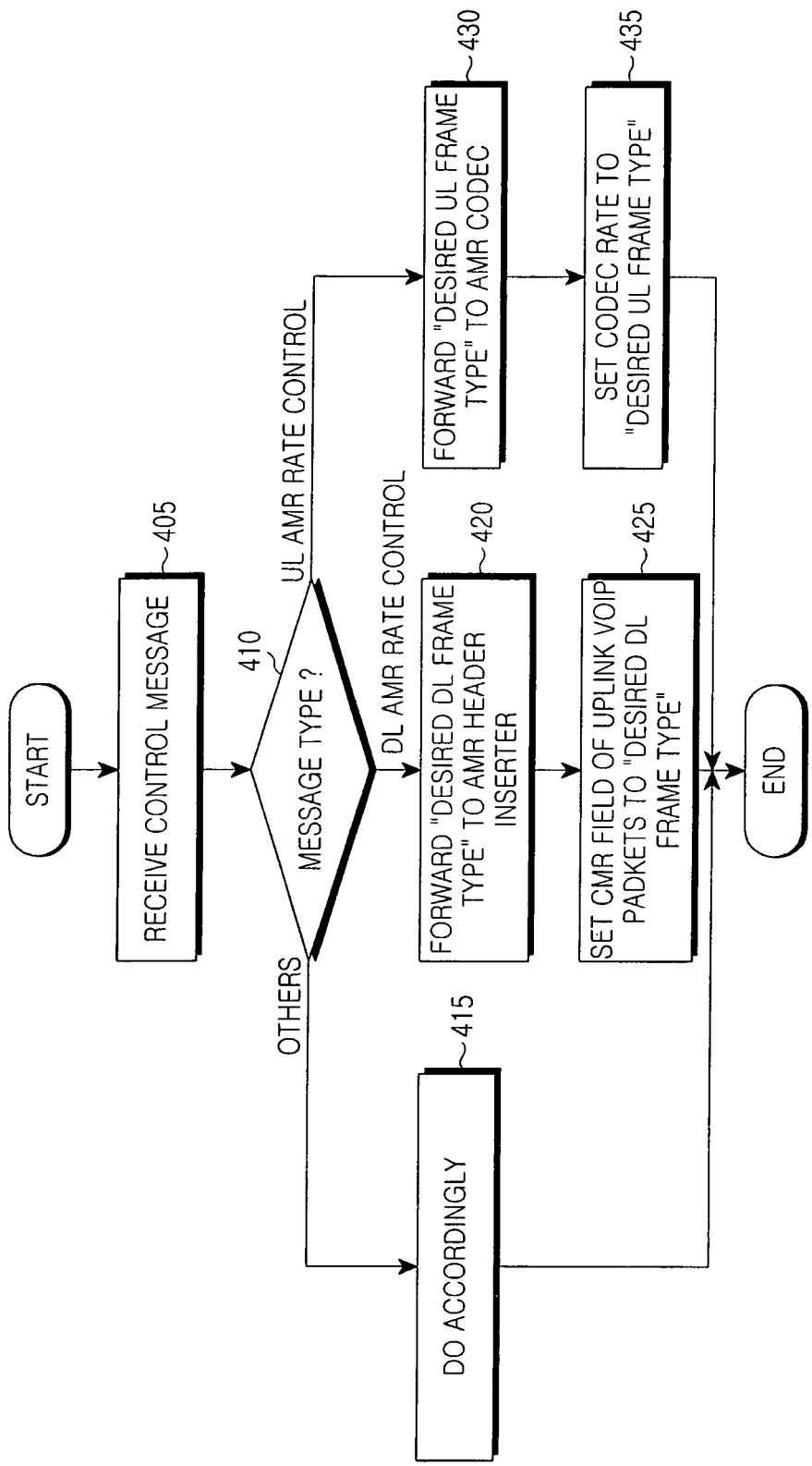
FIG. 4 is a flowchart illustrating an operation of a terminal according to the first exemplary embodiment of the present invention.

FIG. 4 is a flowchart illustrating an operation of a terminal according to the first exemplary embodiment of the present invention.

In an operation of FIG. 4, a terminal receives a Downlink AMR Rate Control message and an Uplink AMR Rate Control message.

The terminal receives a control message from an RNC in step 405, and determines a type of the control message in step 410. If the control message is the Uplink AMR Rate Control message, the terminal proceeds to step 430. If the control message is the Downlink AMR Rate Control message, the terminal proceeds to step 420. If the control message is another message, the terminal proceeds to step 415.

In step 415, the terminal performs a rate control operation according to the information in the control message. This step is equal to its corresponding step in the conventional method, so a detailed description thereof will be omitted.

In step 420, the terminal, if the received message is the Downlink AMR Rate Control message, forwards 'Desired DL Frame Type' information included in the Downlink AMR Rate Control message to an AMR header inserter. In step 425, the AMR header inserter sets a CMR field of an uplink VoIP packet generated later according to the Desired DL Frame Type information prior to transmission.

In step 430, the terminal, if the received message is the Uplink AMR Rate Control message, forwards 'Desired UL Frame Type' information included in the Uplink AMR Rate Control message to an AMR codec. In step 435, the AMR codec sets a codec rate of an uplink VoIP packet generated later according to the Desired UL Frame Type before transmission.

In the first embodiment of the present invention, the RNC should be aware of an AMR codec rate used at a corresponding time and an available AMR codec rate. Therefore, in order for the RNC to recognize the AMR codec rate information, signaling should be preferentially performed between a Serving GPRS Support Node (SGSN) and the RNC.

Second Embodiment

A second embodiment of the present invention proposes a scheme in which an RNC controls a downlink/uplink AMR codec rate without information on an AMR codec rate.

In summary of the second embodiment, an RNC simply provides the information indicating the fact that there is a need to change the current codec rate to a higher codec rate or a lower codec rate, instead of inserting desired FT information into a Downlink AMR Rate Control message and an Uplink AMR Rate Control message. Upon receipt of the Uplink AMR Rate Control message, a terminal adjusts a codec rate of an uplink VoIP packet to a codec rate higher or lower than the current codec rate. Upon receipt of the Downlink AMR Rate Control message, the terminal inserts a value associated with a codec rate higher or lower than the current codec rate into a CMR field of an uplink VoIP packet, under the control of the RNC.

Figure 5:
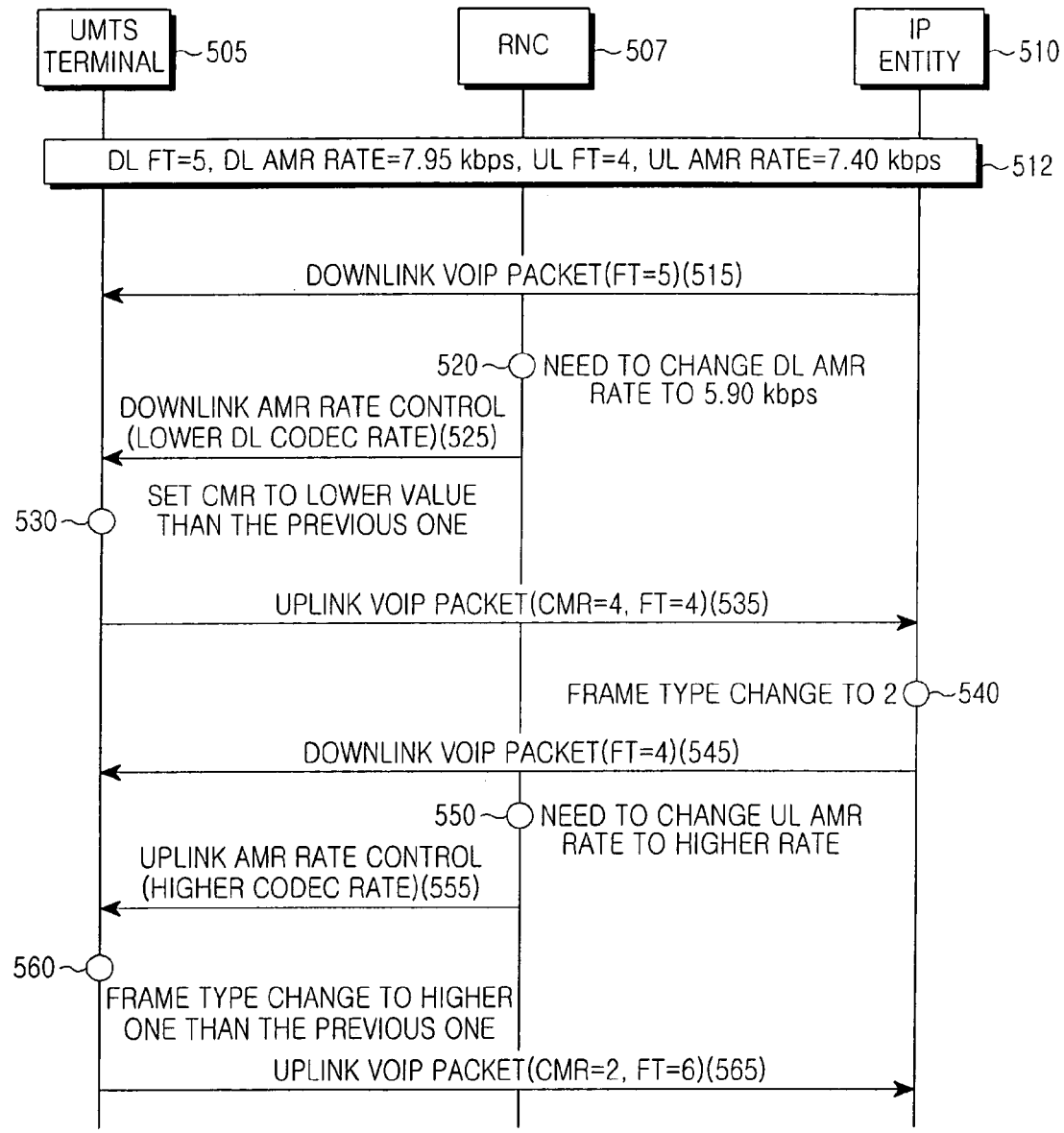
FIG. 5 is a diagram illustrating an AMR rate control operation according to a second exemplary embodiment of the present invention.

FIG. 5 is a diagram illustrating an AMR rate control operation according to a second exemplary embodiment of the present invention.

It is assumed that VoIP communication is being performed between a UMTS terminal 505 and an IP packet 510, a downlink frame type is 5, a downlink AMR rate is 7.95 kbps, an uplink frame type is 4, and an uplink AMR rate is 7.40 kbps.

Therefore, a frame type of a downlink VoIP packet transmitted from the IP entity 510 to the UMTS terminal 505 in step 515 is 5.

In step 520, an RNC 507 desires to change the downlink AMR rate to a lower rate at a particular time. For example, the RNC 507 can change an AMR rate of a terminal located in a cell, if it intends to accommodate traffic of a new terminal in the cell, but has insufficient downlink transmission resources in the cell.

Because the downlink AMR rate is conventionally set by the IP entity 510 and direct communication is not possible between the IP entity 510 and the RNC 507, the RNC 507 controls the AMR rate of the IP entity 510 via the UMTS terminal 505 that is controllable by RNC 507 itself. More specifically, in step 525, the RNC 507 inserts Lower DL codec rate information in a Downlink AMR Rate Control message, and sends the Downlink AMR Rate Control message to the UMTS terminal 505. Here the Lower DL codec rate information indicates a decrease in a downlink AMR codec rate. However, if the RNC 507 desires to increase the downlink AMR rate, it inserts Higher DL codec rate information in the Downlink AMR Rate Control message. In this case, Higher DL codec rate information indicates an increase in a downlink AMR codec rate.

In step 530, upon receipt of the Downlink AMR Rate Control message, the UMTS terminal 505 sets a CMR field of an uplink VoIP packet according to the information included in the received message. That is, if Lower DL codec rate is included in the Downlink AMR Rate Control message, the UMTS terminal 505 sets the CMR field to a value associated with a codec rate lower than the codec rate of the previous downlink VoIP packet. Otherwise, if Higher DL codec rate is included in the Downlink AMR Rate Control message, the UMTS terminal 505 sets the CMR field to a value associated with a codec rate higher than the codec rate of the previous downlink VoIP packet.

In this embodiment, because Lower DL codec rate is included in the Downlink AMR Rate Control message and the FT of the downlink VoIP packet received from the IP entity 510 in step 515 is 5, a CMR field of an uplink VoIP packet transmitted in step 535 is set to 4. In step 540, if the uplink VoIP packet arrives at the IP entity 510, the IP entity 510 sets a frame type of a downlink VoIP packet according to the CMR field of the uplink VoIP packet. That is, by setting the frame type of the VoIP packet transmitted in step 545 to '4', the IP entity 510 sets the downlink AMR rate to 7.40 kbps.

Thereafter, in step 550, the RNC 507 desires to increase the uplink AMR rate at a particular time. For example, the RNC 507 can increase the uplink AMR rate, if it has sufficient available uplink transmission resources and thus desires to allow more uplink transmission resources for the UMTS terminal 505.

In step 555, the RNC 507 inserts Higher UL codec rate information in an Uplink AMR Rate Control message, and transmits the Uplink AMR Rate Control message to the UMTS terminal 505. The Higher UL codec rate information indicates an increase in an uplink AMR codec rate.

In step 560, upon receipt of the Uplink AMR Rate Control message, the UMTS terminal 505 sets a codec rate of an uplink VoIP packet to a codec rate higher than the current codec rate because the Higher UL codec rate information is included in the received message. In addition, the UMTS terminal 505 sets a frame type of the uplink VoIP packet according to the adjusted value. For example, when the frame type of the previous uplink VoIP packet is 5, the frame type of the uplink VoIP packet transmitted to the IP entity 510 in step 565 is set to '6'.

Figure 6:
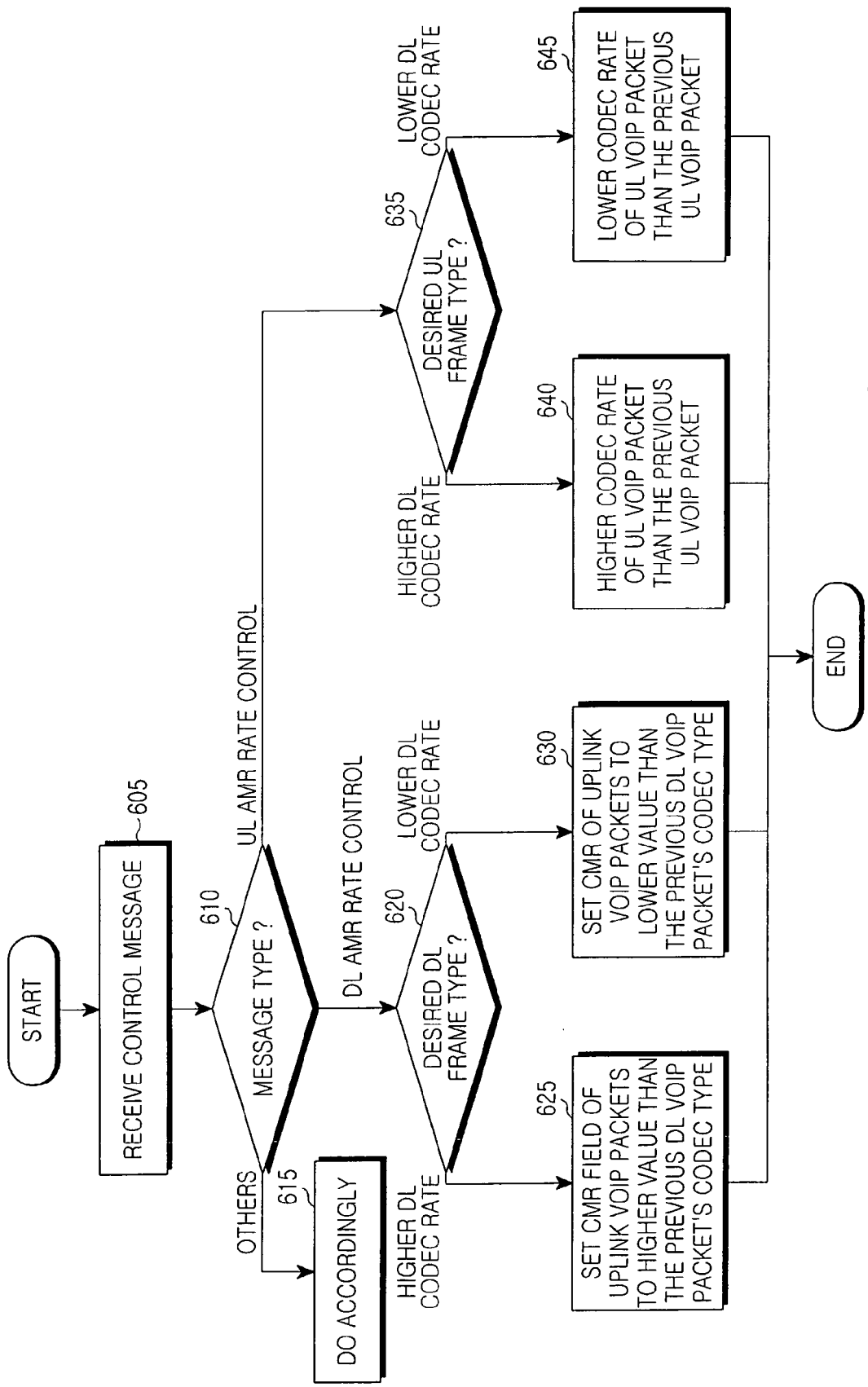
FIG. 6 is a flowchart illustrating an operation of a terminal according to the second exemplary embodiment of the present invention.

FIG. 6 is a flowchart illustrating an operation of a terminal according to the second exemplary embodiment of the present invention.

The terminal receives a control message from an RNC in step 605, and determines a type of the control message in step 610. If the control message is an Uplink AMR Rate Control message, the terminal proceeds to step 635. If the control message is a Downlink AMR Rate Control message, the terminal proceeds to step 620. If the control message is another message, the terminal proceeds to step 615.

In step 615, the terminal performs a rate control operation according to the information in the control message. This step is equal to its corresponding step in the conventional method, so a detailed description thereof will be omitted.

In step 620, the terminal examines Desired DL Frame Type information included in the Downlink AMR Rate Control message. If the Desired DL Frame Type information is Higher DL codec rate information, the terminal proceeds to step 625. If the Desired DL Frame Type information is Lower DL codec rate information, the terminal proceeds to step 630.

In step 625, the terminal selects an AMR rate that is higher than the AMR rate of the previous downlink VoIP packet received prior to the Downlink AMR Rate Control message, and inserts the selected MAR rate into a CMR field of an uplink VoIP packet. In step 630, the terminal selects an AMR rate that is lower than the AMR rate of the previous downlink VoIP packet, and inserts the selected AMR rate into the CMR field of the uplink VoIP packet.

In step 635, the terminal examines Desired UL Frame Type information included in the Uplink AMR Rate Control message. If the Desired UL Frame Type information is Higher UL codec rate information, the terminal proceeds to step 640. If the Desired UL Frame Type information is Lower UL codec rate information thereby indicating a decrease in an uplink AMR codec rate, the terminal proceeds to step 645. In step 640, the terminal adjusts a rate of an uplink VoIP packet so as to have an AMR rate that is higher than the AMR rate of the previous uplink VoIP packet. In step 645, the terminal adjusts the rate of the uplink VoIP packet to an AMR rate that is lower than the AMR rate of the previous uplink VoIP packet.

Although the Downlink AMR Rate Control message and the Uplink AMR Rate Control message are separately used in the first and second exemplary embodiments of the present invention, one of the two messages may perform both of the two functions. That is, it is possible to include both downlink/uplink AMR rate change information in one control message, or control both downlink/uplink AMR rates based on the rate change information included in the one control message.

In addition, the RNC includes the current state information of the terminal, rather than the rate change information, in the control message before transmission, so that the terminal receiving the control message can recognize its uplink transmission environment and perform rate control according thereto.

Third Embodiment

A third embodiment of the present invention proposes a scheme in which an RNC personally adjusts a CMR field of a VoIP packet without using an AMR Rate Control message.

Figure 7:
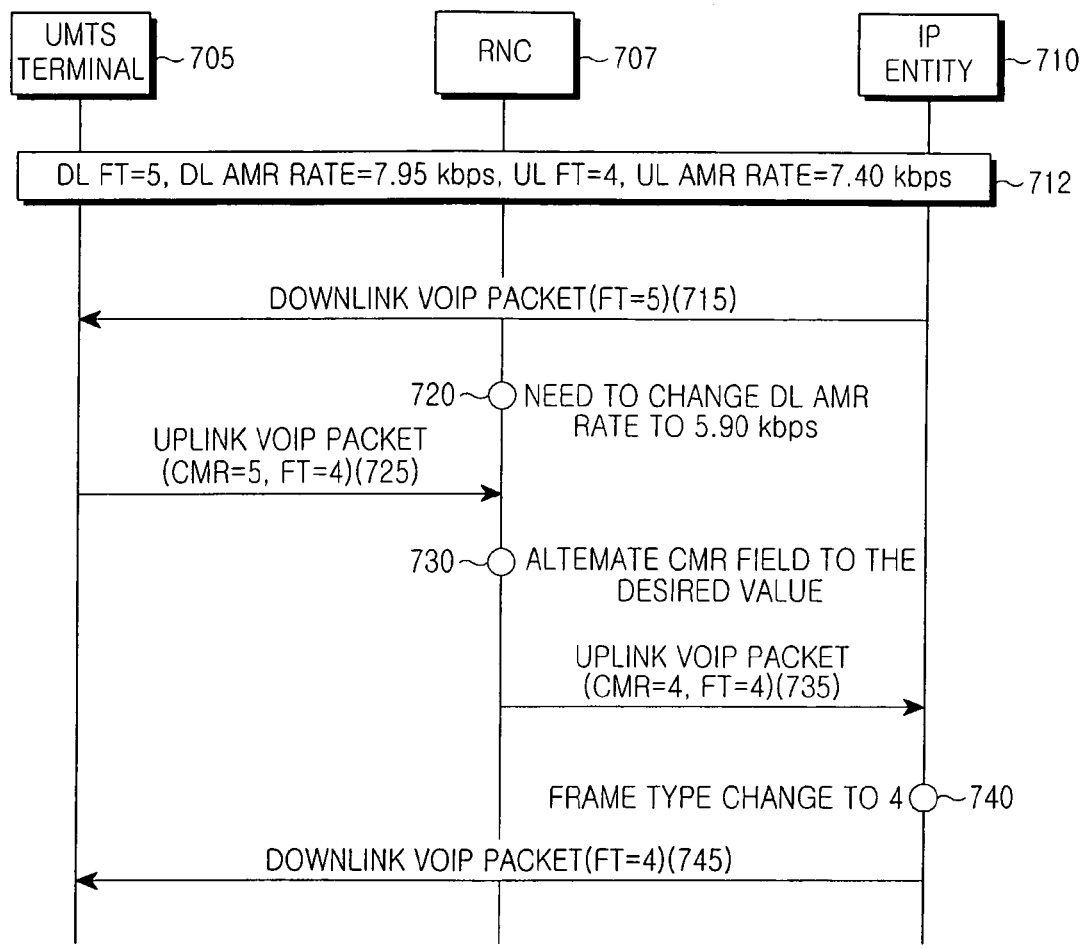
FIG. 7 is a diagram illustrating an AMR rate control operation according to a third embodiment of the present invention.

FIG. 7 is a diagram illustrating an AMR rate control operation according to the third embodiment of the present invention.

It is assumed that VoIP communication is being performed between a UMTS terminal 705 and an IP entity 710 in step 712. A downlink frame type is 5, a downlink AMR rate is 7.95 kbps, an uplink frame type is 4, and an uplink AMR rate is 7.40 kbps.

Therefore, a frame type of a downlink VoIP packet transmitted from the IP entity 710 to the UMTS terminal 705 in step 715 is 5.

In step 720, an RNC 707 desires to change the downlink AMR rate to a lower rate at a particular time. For example, the RNC 707 can change an AMR rate of the terminal 705, if it intends to accommodate traffic of a new terminal, but has insufficient downlink transmission resources to do so.

To change a downlink rate, the RNC 707 changes a CMR field of an uplink VoIP packet received from the UMTS terminal 705 to its desired value.

For example, upon arrival of an uplink VoIP packet with CMR=5 in step 725, the RNC 707 changes the CMR field of the uplink VoIP packet to a value associated with the desired rate in step 730, and transmits the uplink VoIP packet to the IP entity 710 in step 735. In the embodiment of FIG. 7, the value in the CMR field is changed from 5 to 4. In this case, the RNC 707 newly calculates a UDP header checksum value of the uplink VoIP packet taking the new CMR field value into account, and updates the uplink VoIP packet using the UDP header checksum value.

In step 740, the IP entity 710 changes a frame type of the downlink VoIP packet according to the CMR field value of the uplink VoIP packet. In step 745, the IP entity 710 sets the frame type of the downlink VoIP packet to '4' and transmits the downlink VoIP packet with FT=4 to the UMTS terminal 705.

An uplink rate change operation is equal to the downlink rate change operation, so a detailed description thereof will be omitted.

Figure 8:
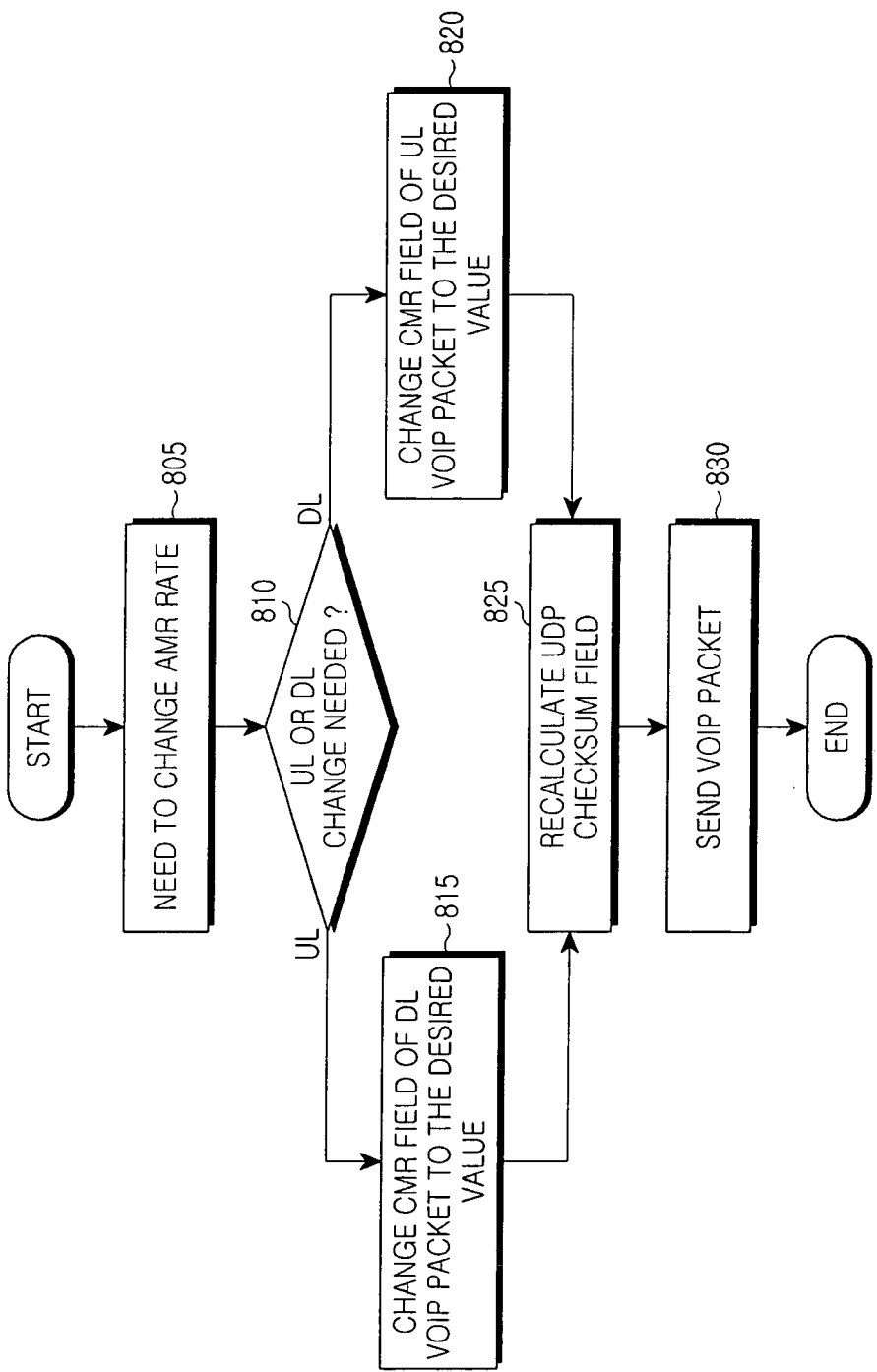
FIG. 8 is a flowchart illustrating an operation of an RNC according to the third embodiment of the present invention.

FIG. 8 is a flowchart illustrating an operation of an RNC according to the third embodiment of the present invention.

If there is a need to change an AMR rate in step 805, an RNC proceeds to step 810.

In step 810, the RNC determines whether it needs to change an uplink AMR rate or a downlink AMR rate. If there is a need to change an uplink AMR rate, the RNC proceeds to step 815. If there is a need to change a downlink AMR rate, the RNC proceeds to step 820.

In step 815, to change the uplink AMR rate, the RNC changes a CMR field of a downlink VoIP packet to be transmitted to a terminal to value associated with the desired rate.

In step 820, to change the downlink AMR rate, the RNC changes a CMR field of an uplink VoIP packet received from a terminal to value associated with the desired rate.

In step 825, the RNC recalculates a UDP checksum of the downlink/uplink VoIP packet whose CMR field has changed. The UDP header has a 2-byte UDP checksum field, and this field is filled with a checksum value for a UDP header, an AMR header and an AMR data part. Therefore, if the CMR field is changed, the checksum value should be recalculated.

In step 830, the RNC sends a downlink/uplink VoIP packet with the changed CMR field and the newly calculated UDP checksum value to the corresponding destination entity.

Figure 9:
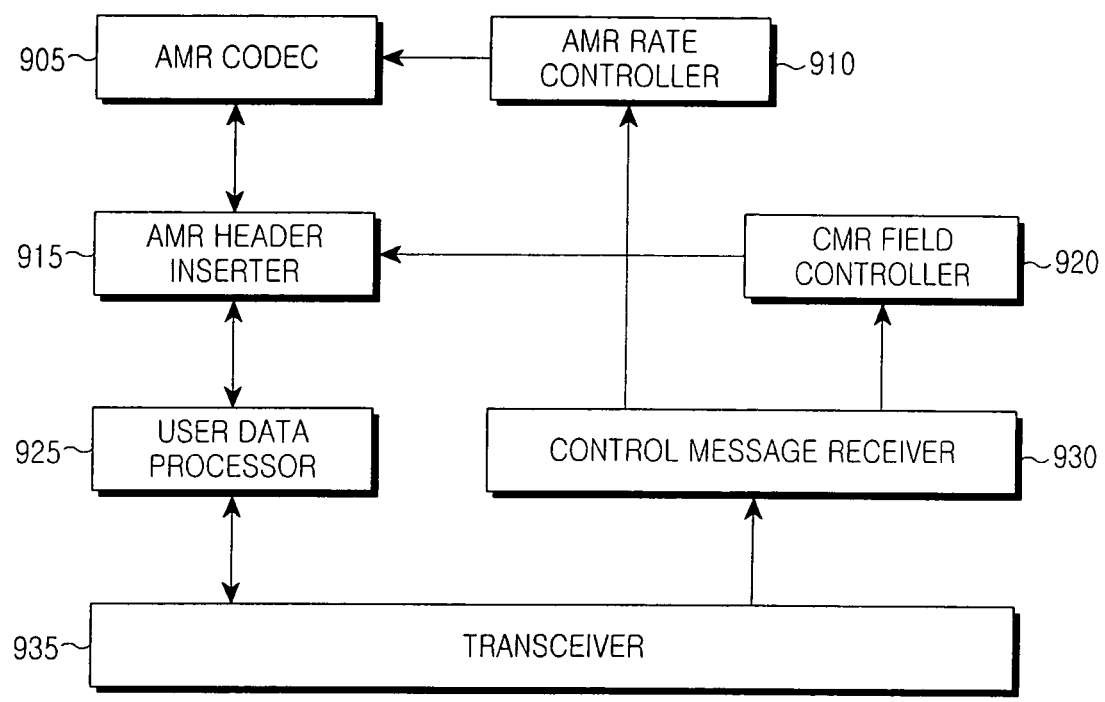
FIG. 9 is a diagram illustrating a structure of a terminal according to the first and second exemplary embodiments of the present invention.

FIG. 9 is a diagram illustrating a structure of a terminal according to the first and second exemplary embodiments of the present invention.

The terminal includes an AMR codec 905, an AMR header inserter 915, a user data processor 925, an AMR rate controller 910, a CMR field controller 920, a control message receiver 930, and a transceiver 935.

The AMR codec 905 converts a voice signal into AMR data, or converts AMR data into a voice signal. The AMR header inserter 915 inserts an AMR header such as CMR and FT into the AMR data. The user data processor 925 is a device for appropriately processing an AMR packet so as to transmit it over a wireless channel, and is composed of a UDP/IP protocol entity and PDCP, RLC, MAC entities.

The transceiver 935 transmits uplink data and receives downlink data over a wireless channel.

The control message receiver 930 receives a control message, and takes an appropriate action according to control information in the control message. Upon receipt of a Downlink AMR Rate Control message, the control message receiver 930 delivers the control information in the control message to the CMR field controller 920. Upon receipt of an Uplink AMR Rate Control message, the control message receiver 930 delivers the control information in the control message to the AMR rate controller 910.

Operations of the CMR field controller 920 and the AMR rate controller 910 are slightly different in the first and second embodiments. A description will first be made of an operation of each device in the first embodiment.

Upon receipt of Desired DL Frame Type information, the CMR field controller 920 delivers the received information to the AMR header inserter 915, and the AMR header inserter 915 sets a CMR field of an uplink VoIP packet to the value delivered by the CMR field controller 920.

Upon receipt of Desired UL Frame Type information, the AMR rate controller 910 delivers the received information to the AMR codec 905. The AMR codec 905 adjusts an uplink AMR rate according to the provided information, and converts a voice signal into AMR data according to the adjusted uplink AMR rate.

A description will now be made of an operation of the CMR field controller 920 in the second embodiment.

If Higher DL codec rate information is included in the Desired DL Frame Type information, the CMR field controller 920 determines an appropriate value to be inserted in a CMR field. In this case, the following details can be taken into consideration by way of example.

1. A new CMR field value should be higher than the AMR rate of the current downlink VoIP packet.
2. The new CMR field value should be one of the AMR rates supported in the other party's IP entity.
3. The CMR field controller selects the value nearest to the AMR rate of the current downlink VoIP packet among the CMR values satisfying the above two conditions.

If Lower DL codec rate information is included in the Desired DL Frame Type information, the CMR field controller 920 determines an appropriate value to be inserted in a CMR field. In this case, the following details can be taken into consideration by way of example.

1. A new CMR field value should be lower than the AMR rate of the current downlink VoIP packet.
2. The new CMR field value should be one of the AMR rates supported in the other party's IP entity.
3. The CMR field controller selects the value nearest to the AMR rate of the current downlink VoIP packet among the CMR values satisfying the above two conditions.

A description will now be made of an operation of the AMR rate controller 910 in the second embodiment.

If Higher UL codec rate information is included in the Desired UL Frame Type information, the AMR rate controller 910 determines a new uplink AMR rate. In this case, the following details can be taken into consideration by way of example.

1. A new uplink AMR rate should be higher than the current uplink AMR rate.
2. A new uplink AMR rate should be one of the AMR rates supported by the terminal.
3. The AMR rate controller should select the value nearest to the current uplink AMR rate among the AMR rates satisfying the above two conditions.

If Lower UL codec rate information is included in the Desired UL Frame Type information, the AMR rate controller 910 determines a new uplink AMR rate. In this case, the following details can be taken into consideration by way of example.

1. A new uplink AMR rate should be lower than the current uplink AMR rate.
2. A new uplink AMR rate should be one of the AMR rates supported by the terminal.
3. The AMR rate controller should select the value nearest to the current uplink AMR rate among the AMR rates satisfying the above two conditions.

Figure 10:
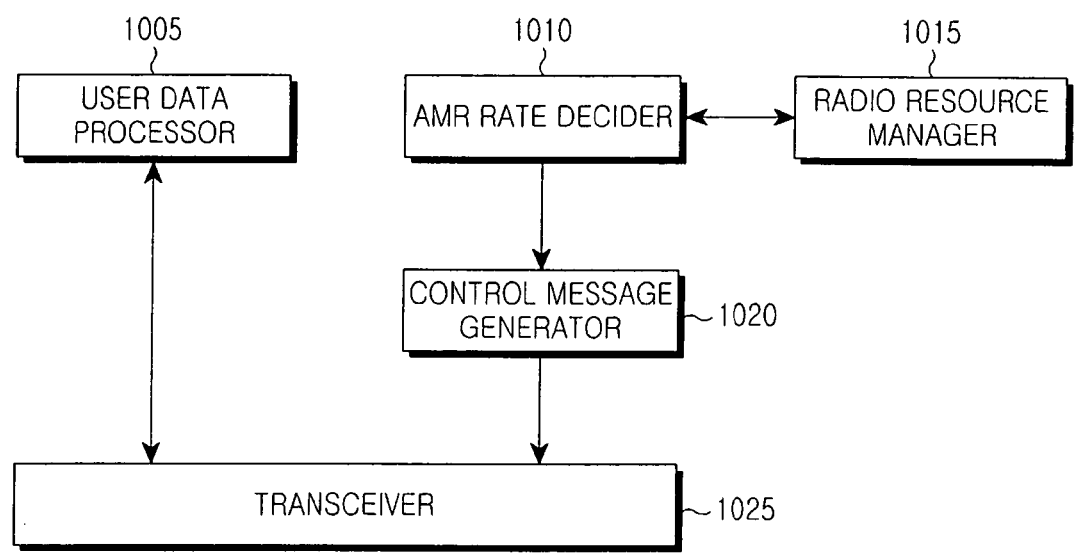
FIG. 10 is a diagram illustrating a structure of an RNC according to the first and second exemplary embodiments of the present invention.

FIG. 10 is a diagram illustrating a structure of an RNC according to the first and second exemplary embodiments of the present invention.

The RNC includes a user data processor 1005, an AMR rate decider 1010, a radio resource manager 1015, a control message generator 1020, and a transceiver 1025.

The user data processor 1005 is a device for processing downlink/uplink user data, and is comprised of PDCP, RLC and MAC entities.

The transceiver 1025 is a device for transmitting/receiving downlink/uplink data.

The control message generator 1020 is a device for generating a control message. Upon receipt of a request for change in the AMR rate from the AMR rate decider 1010, the control message generator 1020 generates a Downlink AMR Rate Control message or an Uplink AMR Rate Control message.

The radio resource manager 1015 is a device for managing radio resources of the cells managed by the RNC, and performs, for example, a Call Admission Control operation. If there is a need to withdraw the radio resources of the cell or there is a need to allocate more radio resources, the radio resource manger 1015 notifies the need to the AMR rate decider 1010.

Upon receipt of a withdraw request for radio resources of a particular cell from the radio resource manager 1015, the AMR rate decider 1010 decreases an AMR rate of a terminal located in the cell. Upon receipt of a notification indicating the possibility of allocating more radio resources in a particular cell from the radio resource manager 1015, the AMR rate decider 1010 increases an AMR rate of a terminal located in the cell. In the first embodiment, the AMR rate decider 1010 determines downlink desired FT information and uplink desired FT information to be inserted into a Downlink AMR Rate Control message and an Uplink AMR Rate Control message, and delivers the determined information to the control message generator 1020.

In the second embodiment, the AMR rate decider 1010 determines Lower DL codec rate information and Higher DL codec rate information, or Lower UL codec rate information and Higher UL codec rate information to be inserted into a Downlink AMR Rate Control message and Uplink AMR Rate Control message, and delivers the determined information to the control message generator 1020.

Figure 11:
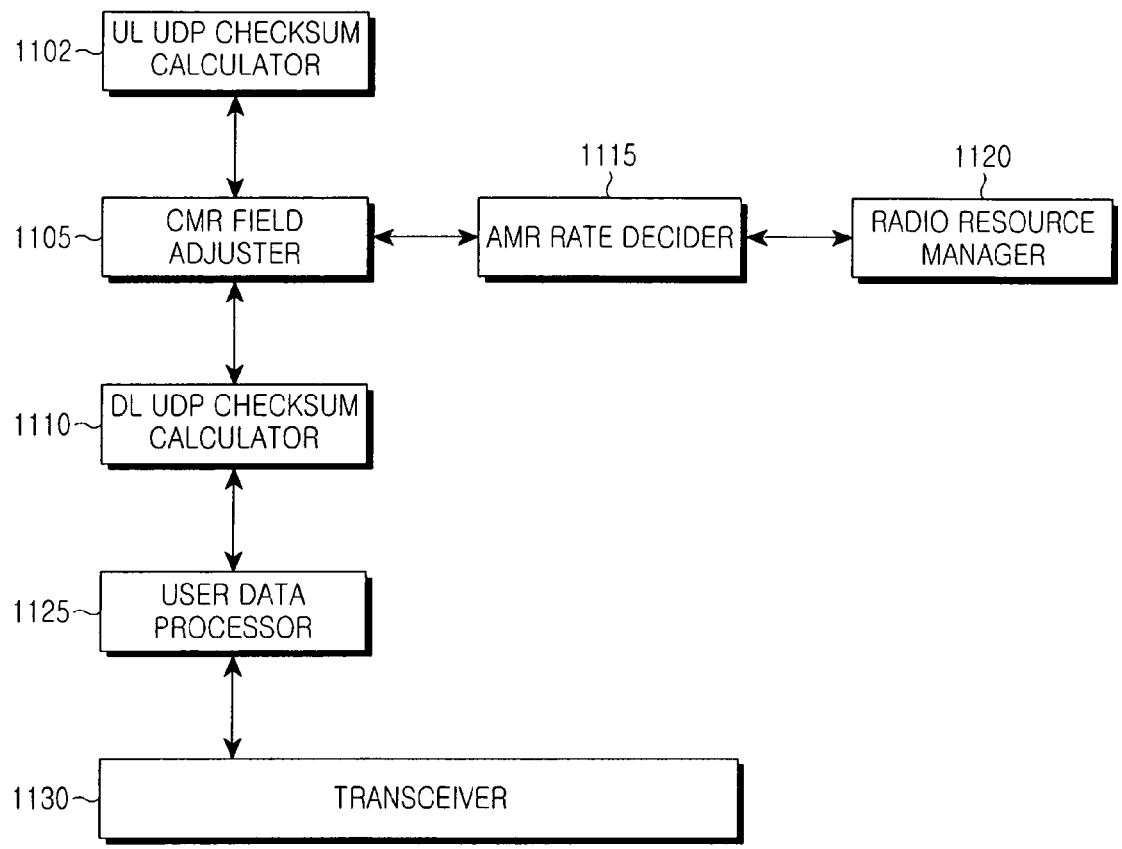
FIG. 11 is a diagram illustrating a structure of an RNC according to the third exemplary embodiment of the present invention.

FIG. 11 is a diagram illustrating a structure of an RNC according to the third exemplary embodiment of the present invention.

The RNC includes a CMR field adjuster 1105, an uplink UDP checksum calculator 1102, a downlink UDP checksum calculator 1110, a user data processor 1125, a transceiver 1130, an AMR rate decider 1115, and a radio resource manager 1120.

The CMR field adjuster 1105, under the control of the AMR rate decider 1115, resets CMR fields of an uplink VoIP packet and a downlink VoIP packet to a new value.

The radio resource manager 1120 is a device for managing radio resources of the cells managed by the RNC, and performs, for example, a Call Admission Control operation. If there is a need to withdraw the radio resources of the cell or there is a need to allocate more radio resources, the radio resource manger 1120 notifies the need to the AMR rate decider 1115.

The downlink UDP checksum calculator 1110 recalculates a UDP checksum value of a downlink VoIP packet delivered from the CMR field adjuster 1105. The downlink VoIP packet processed in the downlink UDP checksum calculator 1110 is transmitted to the terminal via the user data processor 1125. The user data processor 1125 is a device for processing downlink/uplink user data, and is composed of PDCP, RLC and MAC entities. The transceiver 1130 transmits/receives downlink/uplink data.

The uplink UDP checksum calculator 1102 recalculates a UDP checksum value of the uplink VoIP packet delivered from the CMR field adjuster 1105. The uplink VoIP packet processed in the uplink UDP checksum calculator 1102 is delivered to the other party's IP entity via, for example, an SGSN.

The downlink VoIP packet is directly input to the CMR field adjuster 1105 without passing through the uplink UDP checksum calculator 1102, and the uplink VoIP packet is directly input to the CMR field adjuster 1105 without passing through the downlink UDP checksum calculator 1110.

As can be understood from the foregoing description, exemplary embodiments of the present invention allow the network to control a rate of a VoIP packet, thereby efficiently managing the radio resources.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method in a packet-based voice communication system including a terminal for transmitting an IP packet to an IP entity via a radio network entity, the method comprising:

receiving, by a terminal, control information generated from the radio network entity, the control information for triggering an update of an operation of a voice service associated with a downlink voice rate;

generating, by the terminal, an IP packet including a field of the operation of the voice service associated with the downlink voice rate which is updated according to the received control information; and transmitting, by the terminal, the generated IP packet to the IP entity via the radio network, wherein the control information indicates a decrease of the downlink voice rate.

2. The method of claim 1, wherein the field of the operation of the voice service comprises voice rate information.

3. The method of claim 1, wherein the control information is received via a radio control message.

4. The method of claim 1, wherein the control information includes desired frame type (FT) information associated with the downlink voice rate.

5. A terminal for transmitting an IP packet to an IP entity via a radio network entity in a packet-based voice communication system, the terminal comprising:

a receiver for receiving control information generated from the radio network entity, the control information for triggering an update of an operation of a voice service associated with a downlink voice rate;

a controller for generating an IP packet including a field of the operation of the voice service associated with the downlink voice rate which is updated according to the received control information; and a transmitter for transmitting the generated IP packet to the IP entity via the radio network, wherein the control information indicates a decrease of the downlink voice rate.

6. The terminal of claim 5, further comprising:

a voice codec for decoding received packets, which is encoded, by an IP entity, based on the updated field.

7. The terminal of claim 5, wherein the field of the operation of the voice service comprises voice rate information.

8. The terminal of claim 5, wherein the control information is received via a radio control message.

9. The terminal of claim 5, wherein the control information includes desired FT information associated with the downlink voice rate.

* * * * *